United States Patent
Bedwell et al.

[11] 3,899,066
[45] Aug. 12, 1975

[54] LIQUID MANURE LOADING APPARATUS

[75] Inventors: Thomas A. Bedwell, Providence; Bruce L. Call, Logan, both of Utah

[73] Assignee: Hesston Corporation, Heston, Kans.

[22] Filed: Dec. 12, 1973

[21] Appl. No.: 426,632

[52] U.S. Cl. ............................. 198/7 R; 239/651
[51] Int. Cl. ........................................ B65b 65/02
[58] Field of Search ............... 239/651, 662, 675; 214/17 DB, 519; 137/565, 592; 222/238, 412, 413; 198/7 R, 104, 9

[56] References Cited
UNITED STATES PATENTS

| | | | |
|---|---|---|---|
| 1,346,433 | 7/1920 | Varland | 239/651 |
| 3,206,215 | 9/1965 | Jong | 239/662 |
| 3,254,777 | 6/1966 | Vandusen | 214/17 DB |

*Primary Examiner*—M. Henson Wood, Jr.
*Assistant Examiner*—John J. Love
*Attorney, Agent, or Firm*—Schmidt, Johnson, Hovey & Williams

[57] ABSTRACT

A farm implement for handling liquid manure to be used as fertilizer has special loading apparatus mounted on the holding tank of the implement that aggressively agitates the pool of manure concurrently with loading thereof so that all levels of the pool, including the hard crust normally forming thereon, are thoroughly admixed with one another into a proper slurry for handling. A pickup housing may be lowered into the pool from a raised, transport position when the implement is ready to load, and the loader-agitator impeller adjacent the intake of the housing rapidly draws the manure into the housing and sweeps it upwardly into an auger leading to the tank. The tank inlet is automatically closed by an interior valve cover of the housing when the latter is swung into its transport position whereby to prevent leakage of the manure from the tank after loading. Jamming of the loading apparatus by stones which are frequently interspersed throughout the manure being loaded is avoided by virtue of flexible tips on the impeller that yield when jamming is imminent, and by the special controlled manner in which the stones are swirled upwardly by the housing for gravitation into the upwardly facing inlet of the tank.

24 Claims, 5 Drawing Figures

LIQUID MANURE LOADING APPARATUS

This invention relates to systems for handling manure for use as a fertilizer and, more particularly, to the loading of liquid manure into the tank of a handling implement that has been backed into an open reservoir containing a pool of the manure.

The primary object of the present invention is to provide special improvements in the manner in which liquid manure is initially loaded into the holding tank of an implement used in practicing the open pit concepts of manure handling and land fertilization.

Pursuant to the foregoing, another important object of the present invention is to provide loading apparatus which agitates the pool of manure with its relatively hard, thick crust concurrently with loading, and does so with sufficient aggression that an extra time-consuming step of agitating the separated constituent levels of the pool into an easily handled, common slurry prior to loading is not required.

Another important object of this invention is to provide loading apparatus which can rapidly and effectively load from a pool even after the level thereof has dropped substantially.

In accordance with the foregoing, it is an important object of the present invention to provide loading apparatus that includes a pickup housing which can be lowered into a position projecting downwardly below the lower extremity of the holding tank when the implement is ready to load and which can be raised into an out-of-the-way transport position after the tank has been filled.

A further important object of the instant invention is the provision of automatic closing of the inlet to the tank as the housing is raised from its loading position.

Yet another important object of this invention is the provision of loading apparatus which can tolerate the introduction of stones and other hard, foreign objects into the apparatus during loading without resulting in jamming and damage to the apparatus.

A further important object of the invention is to provide loading apparatus which is capable of loading at a substantially faster rate than has heretofore been possible.

RELATED PRIOR ART

W. Den Herder, U.S. Pat. No. 3,183,006, May 11, 1965; F. De Jong, U.S. Pat. No. 3,206,215, Sept. 14, 1965; J. N. Vander Pol U.S. Pat. No. 3,294,407, Dec. 27, 1966;

IN THE DRAWINGS

Figure 1:
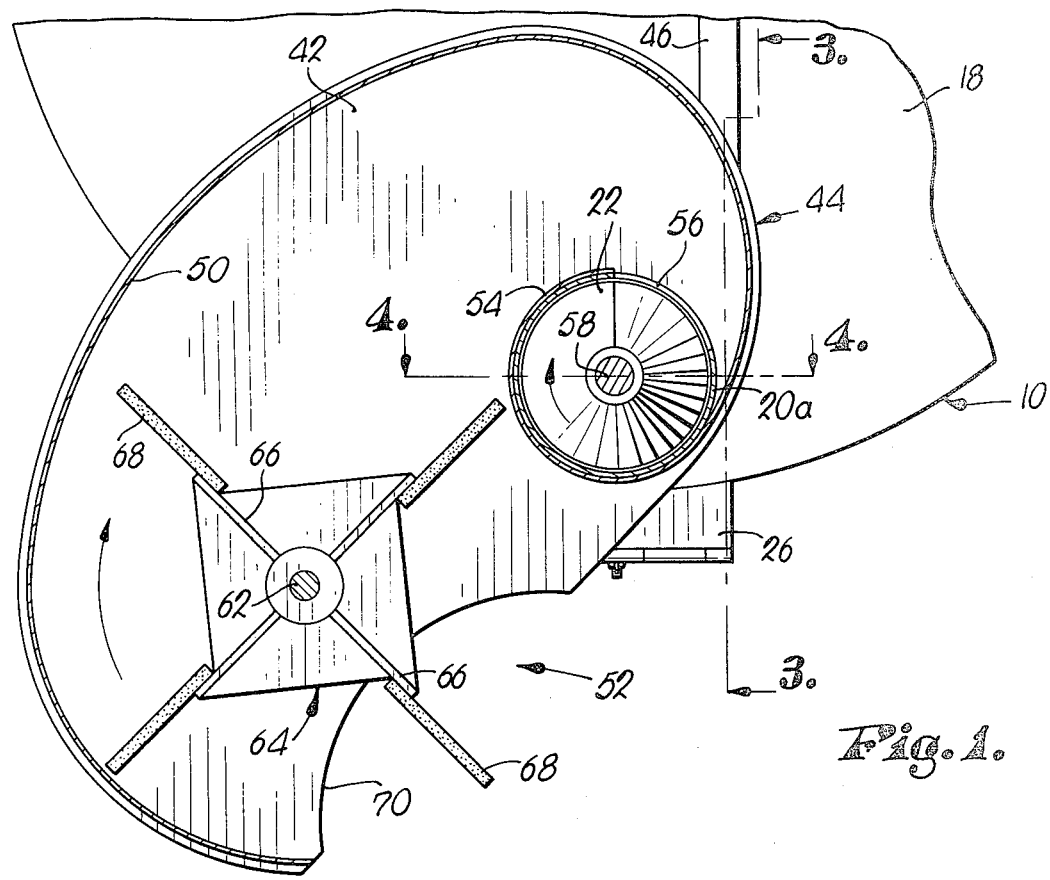
FIG. 1 is a fragmentary, and elevational view of the loading apparatus with the rear sidewall of the pickup housing removed and parts shown in cross-section for clarity, the housing being illustrated in its loading position.

The apparatus of the present invention is adapted for use in connection with a tank 10 which is fragmentarily shown in the drawings, and it is to be understood that tank 10 is preferably rendered mobile through the use of suitable ground-engaging wheels (not shown). Further, it is to be understood that the tank 10 could, of course, form a part of a pull-type implement requiring the latter to be hitched to a suitable tractive vehicle, or it could form a part of a self-propelled implement. Preferably, the apparatus is mounted at the rear of tank 10 so as to allow the implement to be backed into the pool of liquid manure for loading purposes, although this too, is subject to variation and the principles of the present invention are not limited to such a rear-mounted arrangement.

The tank 10 has a pair of mounting collars 12 and 14 located adjacent and secured to the bottom 16 of tank 10, with the collar 12 projecting rearwardly through rear wall 18 of tank 10 and collar 14 spaced a distance inwardly from the latter. Tube structure 20, open at least at its inner end, its fixedly carried by collars 12 and 14 within tank 10 and projects outwardly beyond rear wall 18 for a substantial distance. A conveyor in the nature of a rotary auger 22 is coaxially disposed within tube 20 and terminates rearwardly at the same point as the latter, the forward end (not shown) of auger 22 being drivingly coupled with an appropriate drive source, such as the power takeoff of a tractor. The bottom 16 of tank 10 is provided with a stone sump 26 for collecting stones which may enter tank 10 through the loading apparatus, and sump 26 is provided with a hinged door 28 for periodically removing the collected stones.

The collar 12 has an exterior ring 30 welded thereto which abuts a similar ring 32 fixed to tube 20, the rings 30 and 32 cooperating with a third, independent clamping ring 34 to define a track for capturing a fourth ring 36 forming a part of a third collar 38 that is rotatably supported on tube 20. A series of circumferentially spaced bolts 40 releasably fasten the rings 30–36 together so that tube 20, collar 38 and auger 22 may be removed from tank 10 for shipping or maintenance purposes.

The third collar 38 is fixed at its outer end to one sidewall 42 of a generally elliptical housing 44 whereby to adapt housing 44 for swinging movement about tube 20 with rotatable collar 38. A fluid pressure piston and cylinder unit 46 operably interconnects rear wall 18 of tank 10 and collar 38 for swinging housing 44 between the lowered, loading position thereof illustrated in FIG. 1, and the raised, transport position thereof illustrated in FIG. 2.

The housing 44 has a second sidewall 48 spaced rearwardly from sidewall 42, and an arcuate, generally spiral guide wall 50 that extends transversely between sidewalls 42 and 48 along one stretch of the latter but is discontinuous along the opposite stretch thereof to define an intake area 52 for housing 44. As illustrated, the guide wall 50 leads away from intake 52 at one end of wall 50 and extends arcuately in an elongated convolution until approaching the tube 20 which it almost entirely envelops in a tighter convolution havinb its center coincident with the axes of the tube 20, auger 22 and the axis of swinging movement of housing 44. The innermost terminal portion 54 of wall 50 is shiftable circumferentially about tube 20 to present a valve cover for an inlet 56 located within the first 80° of the wall 20a of tube 20. Thus, as illustrated, the inlet 56 is generally upwardly facing, is approached by guide wall 50 in spaced, spiral relationship from above the same, and is automatically closed and opened by terminal portion 54 during raising and lowering of housing 44 between the positions illustrated in FIGS. 1 and 2.

The auger 22 has an extended shank 58 that projects rearwardly beyond sidewall 48 and carries a chain and sprocket assembly 60 that is coupled with a shaft 62 extending through housing 44 in spaced, parallel relationship to auger 22. The shaft 62 is disposed adjacent intake 52 and carries a loader-agitator impeller 64 having a plurality of wide, radially extending paddles 66 provided with flat impact surfaces extending transversely between sidewalls 42 and 48. Preferably, each paddle 66 has a flexible, flat rubber tip 68 that defines such impact surface. A pair of segment-shaped cutouts 70 are provided on the two opposed sidewalls 42 and 48 adjacent intake 52 in order to expose the tips 68 laterally during rotation of impeller 64. As illustrated, the tips 68 sweep along guide wall 50 in close proximity thereto during rotation of impeller 64 in the direction illustrated in FIG. 1 whereby to draw material into housing 44 in the manner hereinafter described.

Figure 2:
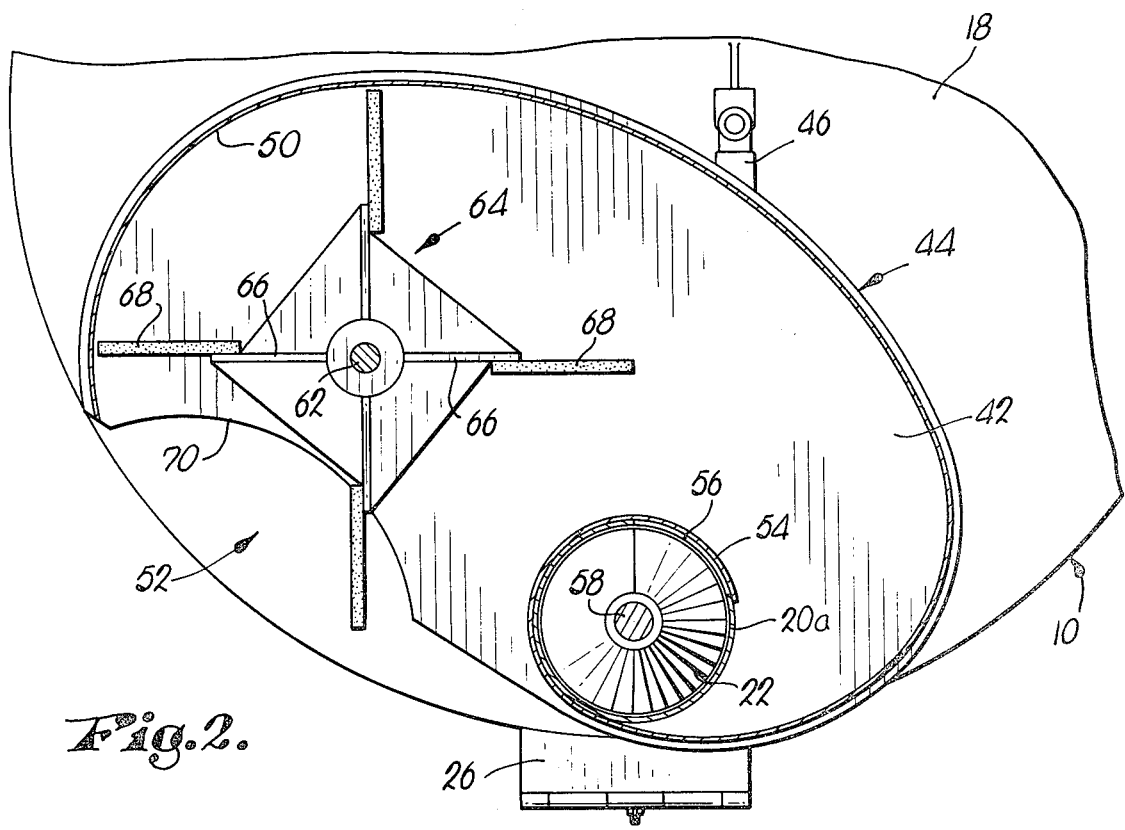
FIG. 2 is a view similar to FIG. 1 but with the pickup housing raised to its transport position.
Figure 3:
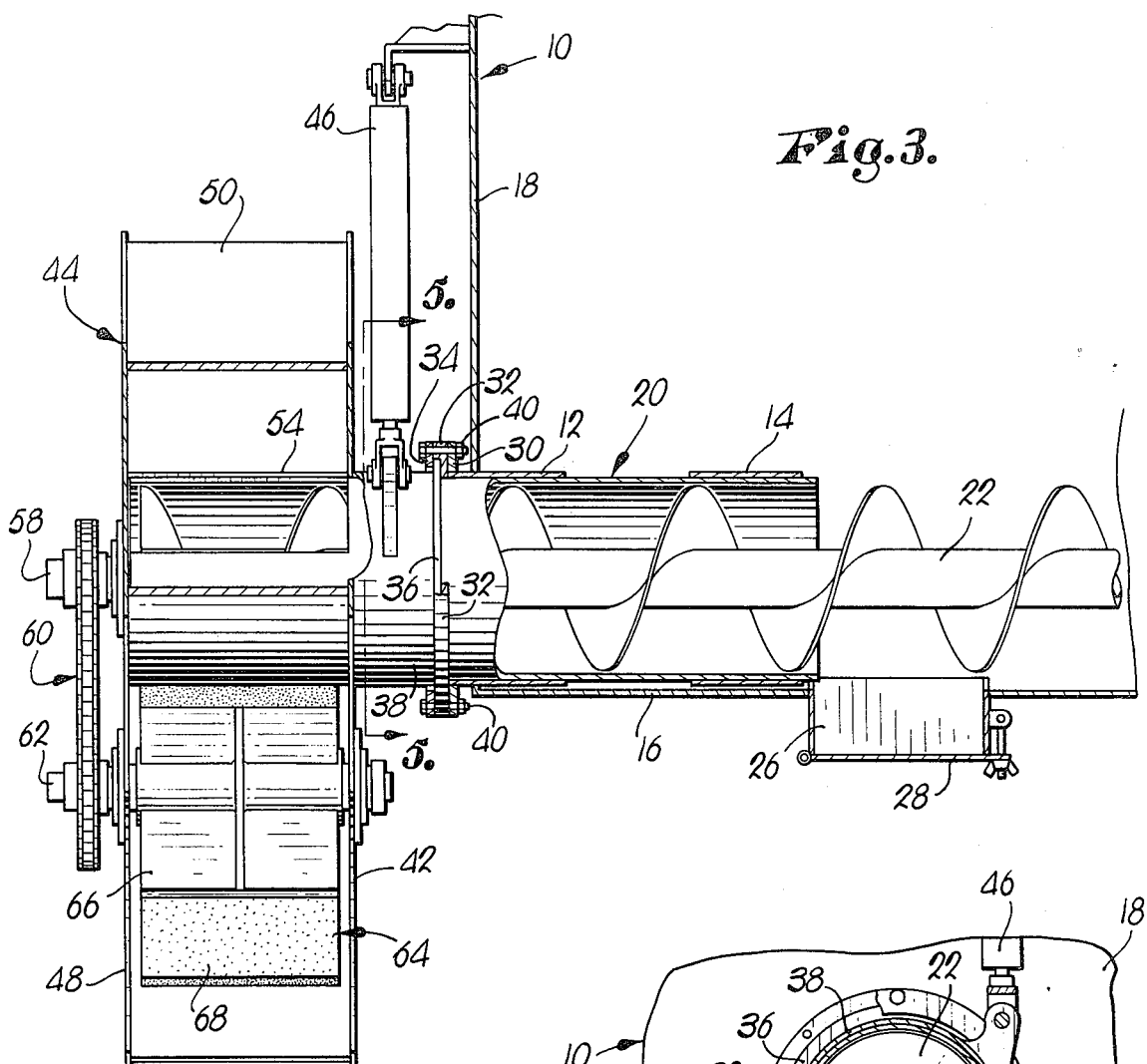
FIG. 3 is a fragmentary, vertical cross-sectional view of the apparatus taken along irregular line 3—3 of FIG. 1.
Figure 5:
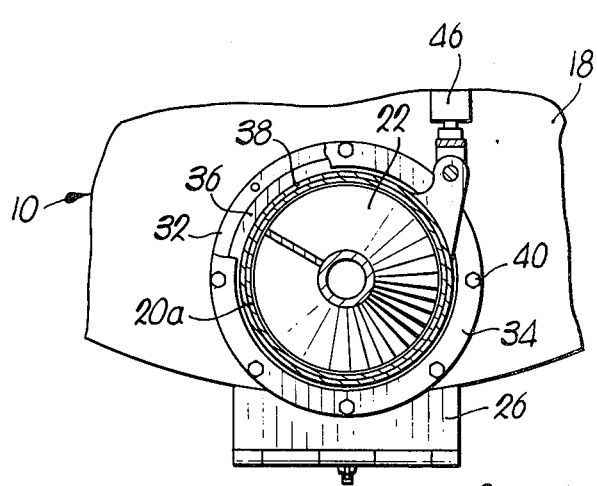
FIG. 5 is a fragmentary, vertical cross-sectional view through the loading auger of the apparatus taken along line 5—5 of FIG. 3.
Figure 4:
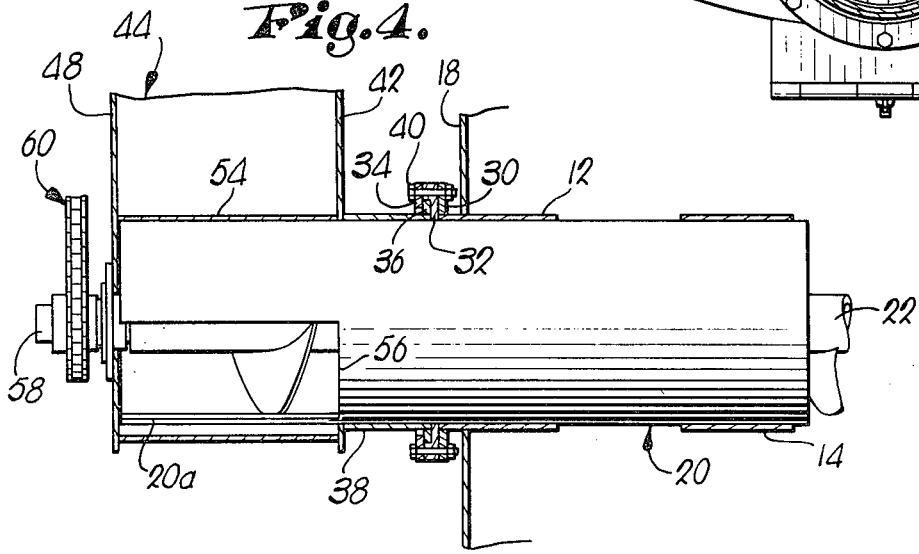
FIG. 4 is a fragmentary, horizontal, cross-sectional view at the apparatus taken along line 4—4 of FIG. 1.

In use, the empty implement is normally maintained with the housing 44 in its transport position as illustrated in FIG. 2 prior to arriving at the reservoir. With housing 44 so positioned the tank 10 is free of downwardly projecting obstructions which might drag on the ground when uneven terrain is encountered. Thus, in its transport position, the housing 44 is well protected against structures which might pass beneath the implement during advancement thereof and which might otherwise strike the housing 44 and seriously damage the loading apparatus.

Upon reaching the reservoir, the implement is moved down a ramp normally provided at such reservoirs until the level of the pool of manure approaches the bottom 16 of tank 10 at its intersection with rear wall 18. Thereupon, the fluid pressure to unit 46 may be released a sufficient extent to allow the housing 44 to swing downwardly in a counterclockwise direction as viewed in FIG. 2, until reaching its loading position as illustrated in FIG. 1 wherein the intake 52 is inserted into the pool of manure. Actuation of the power take-off of the vehicle or other drive means for the auger 22 in the proper direction, causes auger 22 to rotate clockwise, viewing FIG. 1, and such driving power is simultaneously transmitted to the impeller 64 through chain and sprocket assembly 60 to concurrently spin impeller 64 rapidly in a clockwise direction as illustrated in FIG. 1.

Rotation of the impeller 64 causes the paddles 66 to impinge upon the manure within the immediate vicinity of intake 52 and to draw the same into housing 44, not only from a direction to the right of intake 52 (viewing FIG. 1), generally perpendicular to the axis of rotation of impeller 64, but also in a lateral direction through the cutouts 70 in sidewalls 42 and 48. As the material is drawn into housing 44 between the impeller shaft 62 and guide wall 50, it is swept rearwardly and swirled upwardly along guide wall 50 in an elliptical path until reaching the top of housing 44 where it turns down into inlet 56. The auger 22 then carries the material from inlet 56 through tube 20 and into the interior of tank 10 to fill the same.

So long as both the impeller 64 and the auger 22 continue to rotate in the clockwise directions illustrated in FIG. 1, the manure flows into tank 10 without any retrograde escape from the latter back through the inlet 56 an intake 52. Thus, the filling efficiency of the loading apparatus is quite high and the loading process can be carried out in a remarkably short span of time.

Once the tank 10 has been filled, as evidenced by a suitable float device or the like (not shown) on the top of tank 10, the piston and cylinder unit 46 is actuated, while the auger 22 and impeller 64 continue to rotate, so as to swing the housing 44 into its transport position illustrated in FIG. 2. This causes the terminal portion 54 of guide wall 50 to shift circumferentially to the right from its position illustrated in FIG. 1, into covering relationship with the inlet 56 as illustrated in FIG. 2, thus effectively closing inlet 56 and preventing the escape of the manure from tank 10. The continued operation of auger 22 and impeller 64 during the raising of housing 44 assures that retrograde escape of the manure cannot occur during the interval that the terminal portion 54 is moving across inlet 56. Once housing 44 is fully raised, the auger 22 and impeller 64 can be disengaged and the tank 10 will remain filled with manure without any escape thereof through the sealed inlet 56.

During the time that the manure is stored within the reservoir, it has a tendency to separate into several different levels which include a bottom level of heavier substance frequently containing a number of stones, an intermediate level of slurry, and a top level consisting of a crust which is formed from feed material contained in the manure. It is important that these various levels be thoroughly mixed together prior to or during removal thereof from the reservoir because each level has definite value as fertilizer material, because without periodically disturbing the lowermost level the reservoir would tend to gradually reduce itself in size by a buildup of accumulated matter on the bottom thereof, and because the hard crust can create handling problems not only during loading, but also during spreading. In this respect, the loading apparatus of the present invention has proven to be highly desirable and successful because its impeller 64 so aggressively churns and agitates the manure during the loading process that no separate agitating step is required prior to actual loading of the implement as has heretofore been common practice. Not only does the impeller 64 thoroughly intermix the lowermost liquid levels of the pool, it also pulls the top crust of the pool toward the implement during loading and causes such crust to break apart and be thoroughly admixed with the liquid being drawn through intake 52. The result is a common slurry having crust particles of a size that can be easily handled by the apparatus. Substantial savings of valuable time and effort are obtained by the agitating ability of the present loading apparatus since it is only necessary for the operator to back the implement into the reservoir without prior agitation thereof and immediately begin to load the tank 10.

During the loading procedure the implement need not be backed into the reservoir to such deep extent as to jeopardize withdrawing the same from the reservoir when the level of the pool has reached a relatively low point. By virtue of the ability to place the intake 52 at a point substantially below the bottom 16 of tank 10 well into the pool of manure, the rear end of the tank 10 need not be inserted into the pool to the extent required with prior implements. Thus, not only is the loading procedure more safely carried out with the present invention, but the pool itself can be more fully drained than was heretofore possible.

It is important also to recognize that the automatic sealing or closing of the inlet 56 by the housing 44 when the latter is raised is a highly desirable feature of the present invention. Terminal portion 54 always closes inlet 56 when housing 44 is raised, and it maintains inlet 56 well sealed until housing 44 is purposely lowered. The automatic closing arrangement of the present invention assures that the loading operation can be carried out easily, rapidly, and without accidental spillage.

As earlier mentioned, it is not uncommon for the lower level of the manure pool to contain hard foreign objects such as stones. Because it is practically impossible to remove such stones from the pool prior to loading, the apparatus of the present invention has been designed to accept the stones during the loading process without jamming and without damage. In this respect, it is to be noted that the flexible tips 68 of the paddle 66, while being fully adequate to propel the manure and stones upwardly through the housing 44, are inherently capable of yielding when necessary to avoid lodging one or more stones between impeller 64 and guide wall 50. Moreover, the stones are well controlled during their travel through the apparatus, first being swirled upwardly along guide wall 50 and then entering inlet 56 from above the latter. This gravitational entry of the stones into inlet 56 has the benefical effect of causing the stones to readily settle within tube 20 along the lower extent of the auger flighting, whereupon they can be easily pushed into tank 10 to drop into sump 26.

The subject matter of the present invention as hereinabove described is in no way related to the manner of unloading of the tank 10, and for that purpose, any suitable structure may be provided, including mechanism for spreading the manure onto the field as the vehicle is advanced, if so desired.

If necessary or desirable, the housing 44, pivot tube 20, and a part of auger 22 can be completely removed from tank 10. In this respect, loosening and removal of the bolts 40 allows the outer clamping ring 34 to be pulled away, hence permitting housing 44 with its collar 38 to be pulled off tube 20 when unit 46 is disconnected. Tube 20 itself thus becomes released, permitting its removal, and at least a rear section of auger 22, such as behind sump 26, can be subsequently withdrawn, provided any suitable connector (not shown) joining the front and rear sections of auger 22 above sump 26 has first been released. For this purpose, access can be had through sump 26.

Having thus described the invention, what is claimed as new and desired to be secured by Letters Patent is:

1. In an implement having a holding tank for liquid manure obtained from a pool thereof, loading apparatus associated with said tank including:
   a pickup housing mounted on said tank exteriorly thereof and adapted for insertion into said pool,
   said housing having an intake for manure from the pool and said tank having means defining an inlet for picked-up manure from the housing;
   a conveyor disposed adjacent said inlet and leading into the tank for delivering manure from the housing into the tank during operation of the conveyor; and
   an agitator-loader device on said housing adjacent said intake for aggressively churning the pool to thoroughly admix all levels thereof and for concurrently drawing the agitated manure through the housing toward said
   inlet and the conveyor when the device is actuated,
   said housing being retractable from a lowered, loading position to a raised, transport position.

2. In a liquid manure handling implement as claimed in claim 1, wherein said intake is projected downwardly below the lower extremity of the tank when the housing is in its loading position and is maintained above said lower extremity when the housing is in its transport position.

3. In a liquid manure handling implement as claimed in claim 1, wherein said inlet is provided with a valve operable to automatically open and close said inlet during lowering and raising of said housing respectively.

4. In an implement having a holding tank for liquid manure obtained from a pool thereof, loading apparatus associated with said tank including:
   a pickup housing mounted on said tank exteriorly thereof and adapted for insertion into said pool,
   said housing having an intake for manure from the pool and said tank having means defining an inlet for picked-up manure from the housing;
   a conveyor disposed adjacent said inlet and leading into the tank for delivering manure from the housing into the tank during operation of the conveyor; and
   an agitator-loader device on said housing adjacent said intake for aggressively churning the pool to thorougly admix all levels thereof and for concurrently drawing the agitated manure through the housing toward said inlet and the conveyor when the device is actuated,
   said housing being provided with structure mounting the housing on the tank for swinging movement between a lowered, loading position wherein said intake is below the lower extremity of the tank and a raised, transport position wherein said intake is above said extremity.

5. In a liquid manure handling implement as claimed in claim 4, wherein said tank is provided with a power unit coupled with said housing for effecting powered raising of the latter.

6. In a liquid manure handling implement as claimed in claim 4, wherein said structure includes a pivot tube projecting from said tank in communication with the interior thereof and into said housing, said inlet being disposed within said housing in said tube.

7. In a liquid manure handling implement as claimed in claim 6, wherein said housing has an interior valve cover adapted to open and close said inlet during lowering and raising of the housing respectively.

8. In a liquid manure handling implement as claimed in claim 7, wherein said tube has an arcuate sidewall having said inlet therein, said valve cover being concentric with said sidewall for shifting circumferentially about the latter during swinging of the housing.

9. In a liquid manure handling implement as claimed in claim 6, wherein said conveyor comprises an auger disposed within said tube.

10. In a liquid manure handling implement as claimed in claim 9, wherein said device comprises a rotary impeller drivable about an axis of rotation in spaced parallelism to said auger.

11. In a liquid manure handling implement as claimed in claim 10, wherein is provided a drive connection between said auger and said impeller for operating the same in unison.

12. In a liquid manure handling implement as claimed in claim 9, wherein the axis of rotation of said auger and the axis of swinging movement of said housing coincide.

13. In an implement having a holding tank for liquid manure obtained from a pool thereof, loading apparatus associated with said tank including:
   a pickup housing mounted on said tank exteriorly thereof and adapted for insertion into said pool,
   said housing having an intake for manure from the pool and said tank having means defining an inlet for picked-up manure from the housing;
   a conveyor disposed adjacent said inlet and leading into the tank for delivering manure from the housing into the tank during operation of the conveyor; and
   an agitator-loader device on said housing adjacent said intake for aggressively churning the pool to thoroughly admix all levels thereof and for concurrently drawing the agitated manure through the housing toward said inlet and the conveyor when the device is actuated,
   said housing having an arcuate, transverse guide wall leading from said intake toward said inlet, said device comprising a rotary impeller having a series of paddles rotatable in close proximity to said wall for sweeping the manure upwardly along the wall from the intake and into said inlet.

14. In a liquid manure handling implement as claimed in claim 13, wherein said housing has a pair of opposed, spaced-apart sidewalls joined along one stretch by said guide wall and open along an opposite stretch to present said intake, said sidewalls each having a cutout section adjacent the intake to expose said paddles laterally.

15. In a liquid manure handling implement as claimed in claim 13, wherein said tank is provided with a mounting tube projecting into the housing and the tank at opposite ends of the tube, said inlet being disposed in that end within the housing and facing generally upwardly, said guide wall approaching said tube spirally from above the inlet to direct manure upwardly from the paddles, around and down into said inlet.

16. In a liquid manure handling implement as claimed in claim 15, wherein said conveyor comprises an auger within said tube.

17. In a liquid manure handling implement as claimed in claim 13, wherein said paddles have flexible tips for yielding when stones are drawn into the intake along with manure 18. In a liquid manure handling implement as claimed in claim 17, wherein said tank is provided with a sump for collecting such stones.

19. In a liquid manure handling implement as claimed in claim 6, wherein said structure further includes means for guiding said housing during swinging thereof on said tube and for releasably retaining the housing against removal from said tube.

20. In a liquid manure handling implement as claimed in claim 19, wherein said tube is removably mounted on said tank, said guiding and releasable retaining means being operable to releasably retain said tube on the tank.

21. In a liquid manure handling implement:
   a mobile holding tank having a bottom and provided with an inlet;
   a pickup housing having an intake;
   mechanism within said housing for drawing liquid manure into said intake and through the inlet into said tank; and
   structure supporting said housing on the tank for extension and retraction between a raised, storage position and a lowered, operating position,
   said housing when in its operating position being disposed with said intake below said bottom of the tank, and being disposed when in its storage position with said intake and all other portions of the housing at or above the bottom of the tank.

22. In a liquid manure handling implement as claimed in claim 21, wherein said structure includes means mounting said housing for swinging movement between said positions about an axis extending parallel to the normal path of travel of the tank.

23. In an implement having a holding tank for liquid manure obtained from a pool thereof, loading apparatus associated with said tank including:
   a pickup housing mounted on said tank exteriorly thereof and adapted for insertion into said pool,
   said housing having an intake for manure from the pool and said tank having means defining an inlet for picked-up manure from the housing;
   a conveyor disposed adjacent said inlet and leading into the tank for delivering manure from the housing into the tank during operation of the conveyor; and
   an agitator-loader device on said housing adjacent said intake for drawing manure into the housing, said inlet facing away from said device.

24. In a liquid manure handling implement as claimed in claim 23, wherein said inlet-defining means includes a tube extending from the tank, said inlet being in the side of said tube remote from said device.

* * * * *